United States Patent
Rakes

(10) Patent No.: US 10,971,019 B2
(45) Date of Patent: Apr. 6, 2021

(54) VEHICLE COMMUNICATION AND NAVIGATION SYSTEM

(71) Applicant: Honeywell International Inc., Morris Plains, NJ (US)

(72) Inventor: Lonny Wayne Rakes, Scottsdale, AZ (US)

(73) Assignee: Honeywell International Inc., Charlotte, NC (US)

( * ) Notice: Subject to any disclaimer, the term of this patent is extended or adjusted under 35 U.S.C. 154(b) by 247 days.

(21) Appl. No.: 15/937,130

(22) Filed: Mar. 27, 2018

(65) Prior Publication Data

US 2019/0304312 A1 Oct. 3, 2019

(51) Int. Cl.
*G08G 5/00* (2006.01)
*H04L 29/12* (2006.01)
(Continued)

(52) U.S. Cl.
CPC ......... *G08G 5/0021* (2013.01); *G08G 5/0013* (2013.01); *G08G 5/0052* (2013.01);
(Continued)

(58) Field of Classification Search
CPC .. G08G 5/0021; G08G 5/0052; G08G 5/0013; H04B 7/18506; H04L 51/066; H04L 61/2007
(Continued)

(56) References Cited

U.S. PATENT DOCUMENTS 7,328,012 B2   2/2008   Liarno et al.
7,949,335 B2   5/2011   Stefani et al.
(Continued)

FOREIGN PATENT DOCUMENTS

EP   2869247 A1   5/2015
EP   3226227 A1   10/2017
WO   2004087500 A1   10/2004

OTHER PUBLICATIONS

European Search Report issued in related EP 19165043.1, dated Oct. 9, 2019 (8 pages).
(Continued)

*Primary Examiner* — Maceeh Anwari
(74) *Attorney, Agent, or Firm* — Bookoff McAndrews, PLLC

(57) ABSTRACT

A system comprises a vehicle communication application hosted on a portable device. The application generates a traffic control log on screen; generates a free text screen accessible by a user; generates standard traffic control message screens; generates a connectivity services and status screen; provides a regulatory standard communication protocol converter that formats messages to a regulatory standard communication compliant protocol; and provides for regulatory standard communication over Internet protocol processing for communication of regulatory standard communication protocol messages to a datalink device. The system also comprises a ground data center that receives and transmits messages from and to a vehicle, through the application. The data center communicates with a traffic control center, and processes messages received from the vehicle to meet protocol requirements prior to transmitting messages to the traffic control center. The data center also receives responses from the traffic control center for transmission back to the vehicle.

20 Claims, 4 Drawing Sheets

(51) Int. Cl.
*H04L 12/58* (2006.01)
*H04B 7/185* (2006.01)

(52) U.S. Cl.
CPC ....... *H04B 7/18506* (2013.01); *H04L 51/066* (2013.01); *H04L 61/2007* (2013.01)

(58) Field of Classification Search
USPC .......................................................... 701/3
See application file for complete search history.

(56) References Cited

U.S. PATENT DOCUMENTS

| | | |
|---|---|---|
| 8,732,233 B2 | 5/2014 | Allen |
| 9,386,624 B2 | 7/2016 | Scheim et al. |
| 2007/0055416 A1 | 3/2007 | Allen |
| 2012/0177198 A1 | 7/2012 | Cabos |
| 2015/0120097 A1* | 4/2015 | Hathaway ............... B64C 19/00 |
| | | 701/14 |

OTHER PUBLICATIONS

Garmin Connext, "Wireless Connectivity Solutions", Garmin.com/connext, pp. 1-8, Publisher: 2016 Garmin Ltd.
Namowitz, "App Could Deliver IFR Clearances to Mobile Devices", Dated Nov. 30, 2017, pp. 1-8.

* cited by examiner

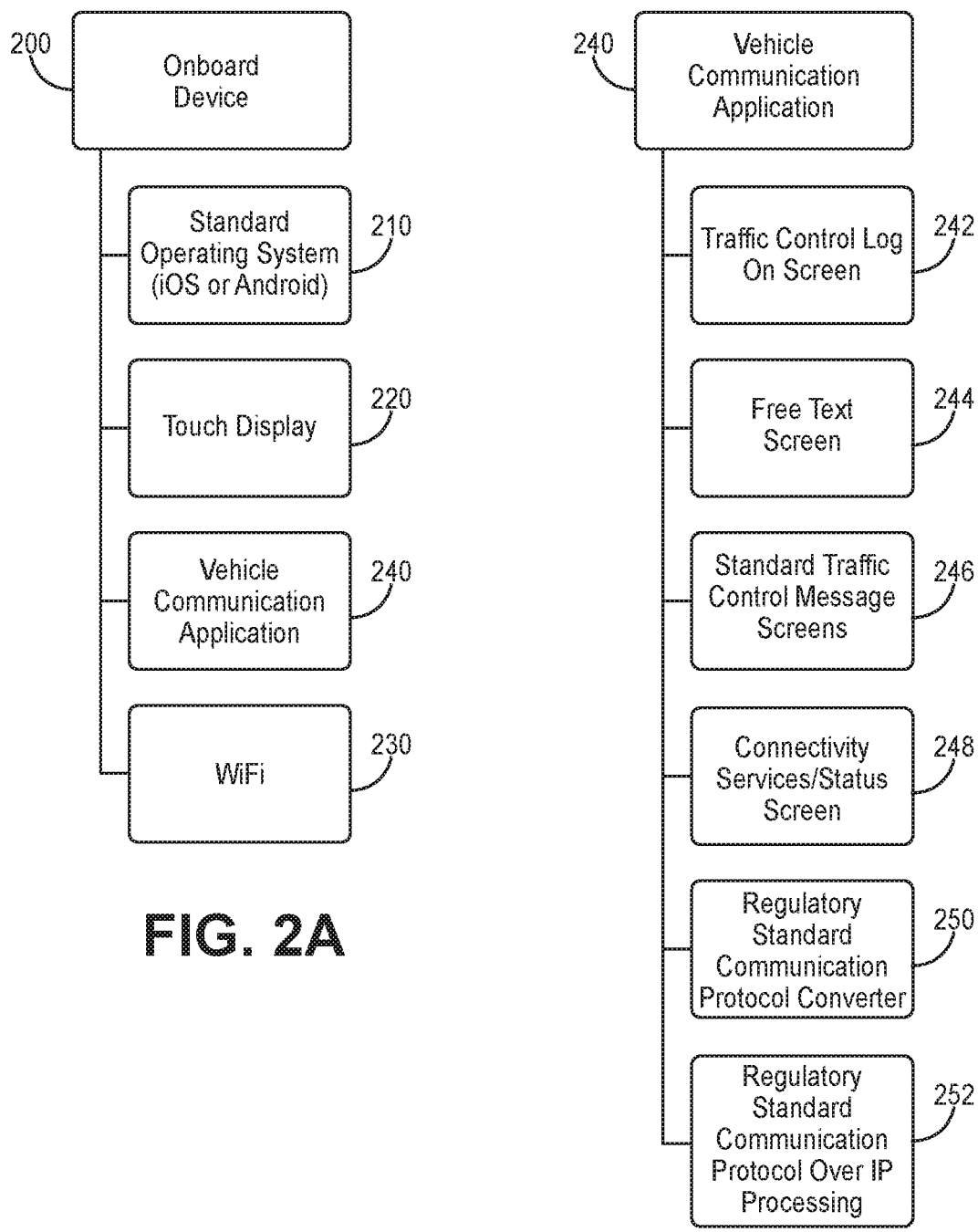

VEHICLE COMMUNICATION AND NAVIGATION SYSTEM

BACKGROUND

Navigation of vehicles such as aircraft is being changed, such as with the advent of Future Air Navigation System (FANS) 1/A. The objective of FANS 1/A is to enable more aircraft to safely and efficiently travel in congested airspace. For example, the FANS 1/A+ protocol leverages modern nonverbal standard communications protocols for a variety of aircraft navigation tasks.

A FANS 1/A compliant aircraft must be properly equipped in order to support the communication and related functionality that is provided by FANS 1/A. This equipment includes compatible radio systems, cockpit interface devices, and surveillance systems. A compliant FANS 1/A system then allows flight crews to communicate nonverbally with air traffic control (ATC). Clearances and messages are exchanged according to required standards and protocols via the on-board radio system.

A fully compliant FANS 1/A system requires significant investment in equipment and subsequent services costs depending on the type of communication system used for the aircraft to ATC connection. A FANS 1/A system is currently only affordable for higher end general aviation/business jet owner/operators and commercial aircraft.

SUMMARY

A system comprises a vehicle communication application hosted on a portable device, with the application comprising instructions stored on a processor readable medium and executable by a processor on the portable device. The application is operative to generate a traffic control log on screen for a display on the portable device, wherein the log on screen is operative by a user to provide access to a datalink communications system; generate a free text screen for the display, wherein the free text screen is accessible by the user to input text messages; generate one or more standard traffic control message screens for the display that are accessible by the user; generate a connectivity services and status screen for the display that are accessible by the user; provide a regulatory standard communication protocol converter that is configured to format messages to a regulatory standard communication compliant protocol; and provide for a regulatory standard communication over Internet protocol (IP) processing that is configured to use a standard IP interface for communication of regulatory standard communication protocol messages to a datalink communication device. The system also comprises a ground data center operative to receive and transmit messages from and to a vehicle, through the application hosted on the portable device. The ground data center is in operative communication with a traffic control center and is operative to process messages received from the vehicle to meet protocol requirements prior to transmission of the messages to the traffic control center. The ground data center is also operative to receive responses from the traffic control center for transmission back to the vehicle using a regulatory standard communication protocol.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which:

FIG. 2A is a block diagram of an exemplary onboard device, which can be utilized in the system of FIG. 1;

FIG. 2B is a block diagram of an exemplary vehicle communication application, which can be hosted on the onboard device of FIG. 2A;

DETAILED DESCRIPTION

Figure 1:
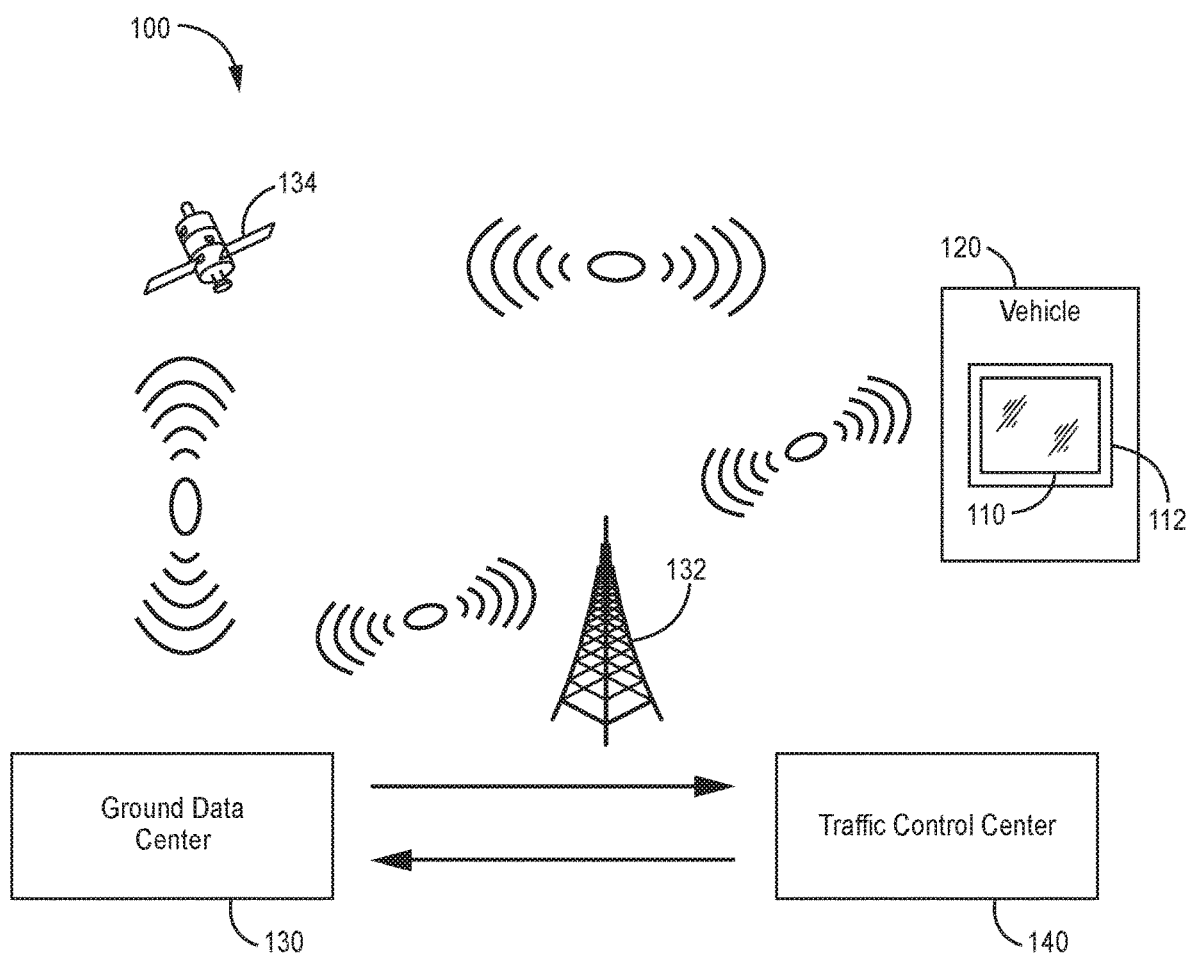
FIG. 1 depicts a general overview of an exemplary system that can be implemented for vehicle communications and navigation.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method for vehicle communications and navigation is disclosed herein. The system generally includes a vehicle communication application hosted on a portable device onboard a vehicle, and a ground data center operative to receive and transmit messages from and to the vehicle, through the vehicle communication application. The vehicle communications are assured and managed through the ground data center, which operatively communicates with a traffic control center.

The vehicle communication application provides an interface/presentation for messages on the portable device, such as text and vehicle management messaging functionality. The ground data center is operative to process messages received from the vehicle to meet protocol requirements prior to transmission of the messages to the traffic control center. The ground data center is also operative to receive responses from the traffic control center for transmission back to the vehicle using a regulatory standard communication protocol.

The present system and method can be used for various vehicles, such as aircraft, ground vehicles, ships, railroad vehicles, trucks, and the like. The appropriate regulatory standard communication protocols for such vehicles can be provided by various appropriate regulatory agencies, such as the Federal Aviation Administration (FAA) or European Aviation Safety Agency (EASA) for aircraft. Exemplary regulatory standard communication protocols can include the aircraft communications addressing and reporting system (ACARS) protocol, the advanced train control system (ATOS) protocol, or the like.

The vehicle communications can be enabled through an air to ground (ATG) system such as Long Term Evolution (LTE) system, or a satellite communications (SATCOM) system.

In some implementations, the system and method provide general aviation operators with a way to support an ACARS protocol, such as Future Air Navigation System (FANS) 1/A communications, through a low cost, reliable ground network. In these implementations, the system includes an aircraft communication application, such as a FANS application, which is hosted on an onboard portable device. The aircraft communication application provides an interface/presentation for datalink messages on the portable device. For example, the aircraft communication application can provide text and flight management messaging functionality that supports controller-pilot data link communication (CPDLC) functions. In these implementations, the ground data center operatively communicates with an Air Traffic Control (ATC) center.

In some embodiments, low cost automatic dependent surveillance-broadcast (ADS-B) receivers can be used onboard aircraft to support any required surveillance components when using the aircraft communication application. An ADS-B receiver can be used to receive information from a ground network, other aircraft positions, weather updates, and the like.

When used for aviation, the present approach makes FANS 1/A /CPDLC communications available to general aircraft operators without significant equipment and physical modifications to their aircraft. The present system combines low cost communication technology with the aircraft communication application to enable FANS/CPDLC communications through the ground data center to the ATC center, preserving required protocol integrity while allowing a high cost capability to be adapted in aircraft where it would be otherwise unaffordable.

Further details of various embodiments are described hereafter with reference to the drawings.

FIG. 1 illustrates a general overview of an exemplary system 100, which can be implemented for vehicle communications and navigation. The system 100 generally includes a vehicle communication application 110 hosted on a portable device 112 onboard a vehicle 120. For example, an aircraft communication application can be used by a pilot or crew member onboard an aircraft. A ground data center 130 is in operative communication with vehicle 120, such as through a digital datalink system for transmission of text-based messages via an airband radio system 132 or a SATCOM system 134. The ground data center 130 is operative to receive and transmit messages from and to vehicle 120, through application 110 hosted on portable device 112. The ground data center 130 is also in operative communication with a traffic control center 140 such an ATC center.

In some implementations, application 110 can operatively communicate with an ADS-B receiver onboard an aircraft. The ADS-B receiver can be used on the aircraft to support any required surveillance when using application 110.

The application 110 is operative to provide a graphical and text interface for datalink messages, such as CPDLC messages, which are transmitted to and received from traffic control center 140 via ground data center 130. The application 110 can also provide Voice over Internet Protocol (VoIP) or Session Initiation Protocol (SIP) communications. The portable device 112 can be a smart phone (e.g., iOS or Android device), tablet device, laptop computer, or the like. For example, a smart phone can be used if an air-to-ground LTE service is employed, or a WiFi connected tablet device can be employed if a SATCOM service is utilized. In some embodiments, a tablet device hosting the FANS application can be connected to an LTE cell phone via Bluetooth. In some embodiments application 110 can include low level iOS/Android services to utilize a provider network for SIP data and voice communications that will be routed to ground data center 130.

The ground data center 130 is operative to process messages received from vehicle 120 as required to meet protocol requirements prior to transmission of the messages to traffic control center 140. The ground data center 130 is also operative to receive responses from traffic control center 140 for transmission back to vehicle 120 using a regulatory standard communication protocol, such as an ACARS protocol in support of FANS 1/A which vehicle 120 is an aircraft. For example, ground data center 130 can incorporate the infrastructure needed to receive FANS/CPDLC communications from the aircraft, performs integrity checks, repeats and/or transmits communications in proper protocol to an ATC center through a reliable network, and sends ATC responses/communications back to the aircraft via a SIP or SATCOM connection.

FIG. 2A illustrates an exemplary onboard device 200, which can be utilized in system 100. FIG. 2A shows various functional components of onboard device 200, which can correspond to portable device 112. The onboard device 200 has a standard operating system (OS) 210, such as iOS or Android, and a standard touch display 220. The onboard device 200 also provides a standard WiFi connection 230, and hosts a vehicle communication application 240.

FIG. 2B illustrates an exemplary embodiment of vehicle communication application 240, including various functional modules. A first application module 242 is operative to generate a traffic control log on screen for touch display 220 of onboard device 200. The log on screen is operative by a user to provide access to a datalink communications system. A second application module 244 is operative to generate a free text screen for touch display 220. The free text screen is accessible by the user to input text messages as needed. A third application module 246 is operative to generate one or more standard traffic control message screens for touch display 220 that are accessible by the user. A fourth application module 248 is operative to generate a connectivity services and status screen for touch display 220 that is accessible by the user. A fifth application module 250 is operative to provide an regulatory standard communication protocol converter that is configured to format messages to a regulatory standard communication protocol compliant protocol. A sixth application module 252 is operative to provide for regulatory standard communication protocol over Internet protocol (IP) processing that is configured to use a standard IP interface for communication of regulatory standard communication protocol messages to a datalink communication device.

Figure 2C:
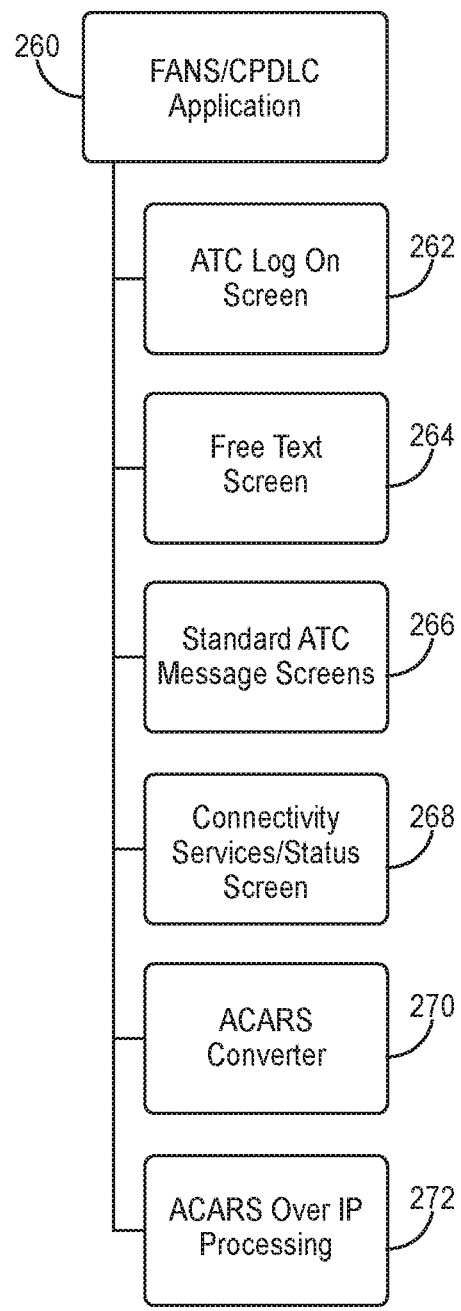
FIG. 2C is a block diagram of an exemplary aircraft communication application, which can be hosted on the onboard device of FIG. 2A.

FIG. 2C illustrates an example of a vehicle communication application in the form of an aircraft communication application, such as a FANS/CPDLC application 260 with various functional modules. A first application module 262 is operative to generate an ATC log on screen for touch display 220 of onboard device 200. The log on screen is operative by a pilot to provide access to a datalink communications system. A second application module 264 is operative to generate a free text screen for touch display 220. The free text screen is accessible by the pilot to input text messages as needed. A third application module 266 is operative to generate one or more standard ATC message screens for touch display 220 that are accessible by the pilot. A fourth application module 268 is operative to generate a connectivity services and status screen for touch display 220 that is accessible by the pilot. A fifth application module 270 is operative to provide an ACARS converter that is configured to format messages to an ACARS compliant protocol (e.g., FANS1/A). A sixth application module 272 is operative to provide for ACARS over IP processing that is configured to use a standard IP interface for communication of ACARS protocol messages to a datalink communication device.

Figure 3:
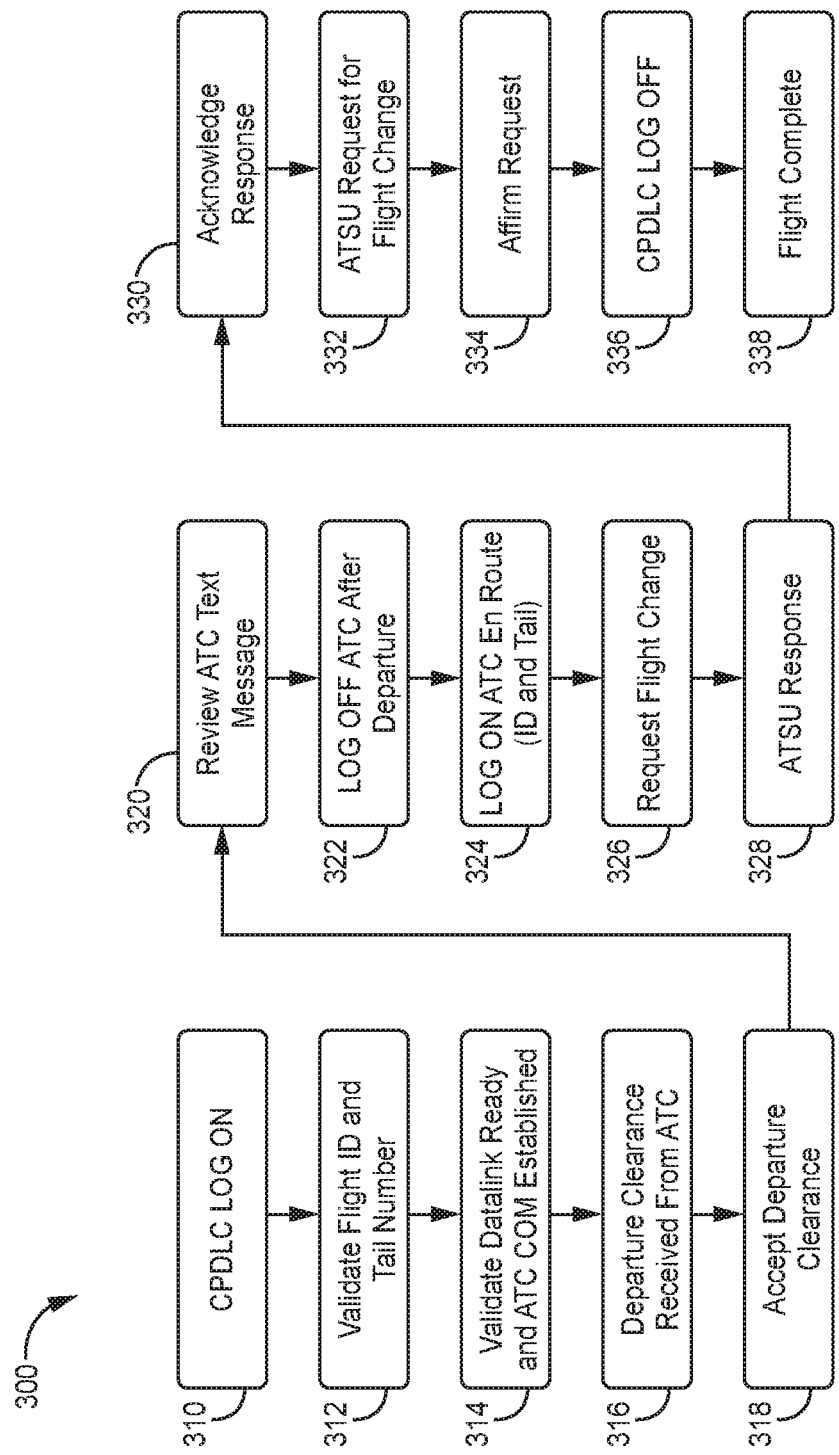
FIG. 3 is a flow diagram of an exemplary operational method of an aircraft communication application, which can be hosted on the onboard device of FIG. 2A.

FIG. 3 is a flow diagram of an exemplary operational method 300 for an aircraft communication application, such as FANS/CPDLC application 260. Initially, a pilot in an aircraft performs a log on operation, such as a CPDLC log on (block 310) using the application on a portable device. The method 300 then validates a flight identification (ID) and aircraft tail number (block 312) of the aircraft. The method 300 also validates that a datalink system is ready and that ATC communications are established (block 314). A departure clearance is then received by the application from ATC (block 316), and the pilot can accept the departure clearance using the ATC message screen of the application (block 318).

Next, the pilot can review any ATC text messages (block 320) on the ATC message screen, and then log off the ATC message screen after departure (block 322). The pilot can log on to the ATC message screen en route (using ID and tail number) (block 324), and can request a flight change if needed (block 326). An air traffic services unit (ATSU) response is then received by the application (block 328). The pilot can acknowledge the ATSU response using the ATC message screen (block 330). An ATSU request for flight change can also be received by the application (block 332), and the pilot can affirm the request using the ATC message screen (block 334). The pilot can then perform a log off operation, such as a CPDLC log off (block 336) using the application, when the flight is complete (block 338).

A processor used in the present system can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present method and system.

The present method can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. Various process tasks can include controlling spatial scanning and orientation, laser operation, photodetector control and operation, and awareness of system orientation and state. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact disks, or other optical storage disks; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

EXAMPLE EMBODIMENTS

Example 1 includes a system comprising a vehicle communication application hosted on a portable device, the application comprising instructions stored on a processor readable medium and executable by a processor on the portable device such that the application is operative to: generate a traffic control log on screen for a display on the portable device, wherein the log on screen is operative by a user to provide access to a datalink communications system; generate a free text screen for the display, wherein the free text screen is accessible by the user to input text messages; generate one or more standard traffic control message screens for the display that are accessible by the user; generate a connectivity services and status screen for the display that are accessible by the user; provide a regulatory standard communication protocol converter that is configured to format messages to a regulatory standard communication compliant protocol; and provide for regulatory standard communication over Internet protocol (IP) processing that is configured to use a standard IP interface for communication of regulatory standard communication protocol messages to a datalink communication device. The system also includes a ground data center operative to receive and transmit messages from and to a vehicle, through the application hosted on the portable device. The ground data center is in operative communication with a traffic control center and is operative to: process messages received from the vehicle to meet protocol requirements prior to transmission of the messages to the traffic control center; and receive responses from the traffic control center for transmission back to the vehicle using a regulatory standard communication protocol.

Example 2 includes the system of Example 1, wherein the portable device comprises a smart phone, a tablet device, or a laptop computer.

Example 3 includes the system of any of Examples 1-2, wherein the application is operative to provide a graphical and text interface for datalink messages.

Example 4 includes the system of any of Examples 1-3, wherein the application is operative to provide voice over Internet protocol (VoIP) communications, or session initiation protocol (SIP) communications.

Example 5 includes the system of any of Examples 1-4, wherein the application is operative to receive and transmit messages through a long term evolution (LTE) system, or a satellite communications (SATCOM) system.

Example 6 includes a system comprising an aircraft communication application hosted on a portable device, the application comprising instructions stored on a processor readable medium and executable by a processor on the portable device such that the application is operative to: generate an air traffic control (ATC) log on screen for a display on the portable device, wherein the log on screen is operative by a user to provide access to a datalink communications system; generate a free text screen for the display, wherein the free text screen is accessible by the user to input text messages; generate one or more standard ATC message screens for the display that are accessible by the user; generate a connectivity services and status screen for the display that are accessible by the user; provide an aircraft communications addressing and reporting system (ACARS) converter that is configured to format messages to an ACARS compliant protocol; and provide for ACARS over IP processing that is configured to use a standard IP interface for communication of ACARS protocol messages to a datalink communication device. The system also includes a ground data center operative to receive and transmit messages from and to an aircraft, through the application hosted on the portable device. The ground data center is in operative communication with an ATC center and is operative to: process messages received from the aircraft to meet protocol requirements prior to transmission of the messages to the ATC center; and receive responses from the ATC center for transmission back to the aircraft using an ACARS protocol.

Example 7 includes the system of Example 6, wherein the portable device comprises a smart phone, a tablet device, or a laptop computer.

Example 8 includes the system of any of Examples 6-7, wherein the application is operative to provide a graphical and text interface for datalink messages.

Example 9 includes the system of any of Examples 6-8, wherein the application is operative to provide flight management messaging that supports controller-pilot data link communication (CPDLC).

Example 10 includes the system of any of Examples 6-9, wherein the application is operative to provide VoIP communications, or SIP communications.

Example 11 includes the system of any of Examples 6-10, wherein the application is operative to receive and transmit messages through an air to ground system comprising a LTE system, or a SATCOM system.

Example 12 includes the system of any of Examples 6-11, wherein the ACARS compliant protocol comprises a CPDLC compliant protocol.

Example 13 includes the system of any of Examples 6-12, wherein the ACARS compliant protocol comprises a future air navigation system (FANS) 1/A compliant protocol.

Example 14 includes the system of any of Examples 6-13, wherein the application operatively communicates with an automatic dependent surveillance-broadcast (ADS-B) receiver onboard the aircraft.

Example 15 includes a program product, comprising a non-transitory processor readable medium having instructions stored thereon, executable by a processor in a portable device, to operate an aircraft communication application hosted on the portable device, the application comprising: a first application module operative to generate an ATC log on screen for a display on the portable device, wherein the log on screen is operative by a user to provide access to a datalink communications system; a second application module operative to generate a free text screen for the display, wherein the free text screen is accessible by the user to input text messages; a third application module operative to generate one or more standard ATC message screens for the display that are accessible by the user; a fourth application module operative to generate a connectivity services and status screen for the display that are accessible by the user; a fifth application module operative to provide an ACARS converter that is configured to format messages to an ACARS compliant protocol; and a sixth application module operative to provide for ACARS over IP processing that is configured to use a standard IP interface for communication of ACARS protocol messages to a datalink communication device.

Example 16 includes the program product of Example 15, wherein the application is operative to provide a graphical and text interface for datalink messages.

Example 17 includes the program product of any of Examples 15-16, wherein the application is operative to provide flight management messaging that supports CPDLC.

Example 18 includes the program product of any of Examples 15-17, wherein the application is operative to provide VoIP communications, or SIP communications.

Example 19 includes the program product of any of Examples 15-18, wherein the ACARS compliant protocol comprises a CPDLC compliant protocol.

Example 20 includes the program product of any of Examples 15-19, wherein the ACARS compliant protocol comprises a FANS 1/A compliant protocol.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A system comprising:
a vehicle communication application hosted on a portable device, the vehicle communication application comprising instructions stored on a non-transitory processor readable medium and executable by a processor on the portable device such that the vehicle communication application is operative to:
generate a traffic control log on screen of the portable device, wherein the traffic control log on screen is operative by a user to access a datalink communications system;
generate a free text screen accessible by the user to input text messages on the portable device;
generate one or more standard traffic control message screens accessible by the user on the portable device;
receive a user input of a text message via the free text screen or a selection of a standard traffic control message via the one or more standard traffic control message screens, the user input confirming or requesting clearances and/or changes;
format a message based on the received user input in accordance with a regulatory standard communication compliant protocol; and
transmit the message using a standard IP interface to a datalink communication device, the datalink communication device transmitting the message to a ground center configured to receive, process, and re-transmit, to a traffic control center, messages received from the vehicle communication application that meet protocol requirements prior to transmission of the messages to the traffic control center, using the regulatory standard communication compliant protocol.

2. The system of claim 1, wherein the portable device comprises a smart phone, a tablet device, or a laptop computer.

3. The system of claim 1, wherein the vehicle communication application is operative to provide a graphical and text interface for datalink messages.

4. The system of claim 1, wherein the vehicle communication application is operative to provide voice over Internet protocol (VoIP) communications, or session initiation protocol (SIP) communications.

5. The system of claim 1, wherein the vehicle communication application is operative to receive and transmit messages through a long term evolution (LTE) system, or a satellite communications (SATCOM) system.

6. A system comprising:
an aircraft communication application hosted on a portable device, the aircraft communication application comprising instructions stored on a non-transitory processor readable medium and executable by a processor on the portable device such that the aircraft communication application is operative to:
generate an air traffic control (ATC) log on screen of the portable device, wherein the ATC log on screen is operative by a user to access a datalink communications system;
generate a free text screen accessible by the user to input text messages on the portable device;
generate one or more standard ATC message screens accessible by the user on the portable device;
receive a user input of a text message via the free text screen or a selection of a standard ATC message via the one or more standard ATC message screens, the user input confirming or requesting clearances and/or flight changes;
format a message based on the user input in accordance with an aircraft communications addressing and reporting system (ACARS) compliant protocol; and
transmit the message using a standard IP interface to a datalink communication device, the datalink communication device transmitting the message to a ground center configured to receive, process, and re-transmit, to an ATC center, messages received from the aircraft communication application that meet protocol requirements prior to transmission of the messages to the ATC center, using the ACARS compliant protocol.

7. The system of claim 6, wherein the portable device comprises a smart phone, a tablet device, or a laptop computer.

8. The system of claim 6, wherein the aircraft communication application is operative to provide a graphical and text interface for datalink messages.

9. The system of claim 6, wherein the aircraft communication application is operative to provide flight management messaging that supports controller-pilot data link communication (CPDLC).

10. The system of claim 6, wherein the aircraft communication application is operative to provide voice over Internet protocol (VoIP) communications, or session initiation protocol (SIP) communications.

11. The system of claim 6, wherein the aircraft communication application is operative to receive and transmit messages through an air to ground system comprising a long term evolution (LTE) system, or a satellite communications (SATCOM) system.

12. The system of claim 6, wherein the ACARS compliant protocol comprises a CPDLC compliant protocol.

13. The system of claim 6, wherein the ACARS compliant protocol comprises a future air navigation system (FANS) 1/A compliant protocol.

14. The system of claim 6, wherein the aircraft communication application operatively communicates with an automatic dependent surveillance-broadcast (ADS-B) receiver onboard an aircraft.

15. A program product, comprising:
a non-transitory processor readable medium having instructions stored thereon, executable by a processor in a portable device, to operate a method of an aircraft communication application hosted on the portable device, the method comprising:
generate an air traffic control (ATC) log on screen of the portable device, wherein the ATC log on screen is operative by a user to access a datalink communications system;
generate a free text screen accessible by the user to input text messages on the portable device;
generate one or more standard ATC message screens accessible by the user on the portable device;
receive a user input of a text message via the free text screen or a selection of a standard ATC message via the one or more standard ATC message screens, the user input confirming or requesting clearances and/or flight changes;
format a message based on the user input in accordance with an aircraft communications addressing and reporting system (ACARS) compliant protocol; and
transmit the message using a standard IP interface to a datalink communication device, the datalink communication device transmitting the message to a ground center configured to receive, process, and re-transmit, to an ATC center, messages received from the aircraft communication application that meet protocol requirements prior to transmission of the messages to the ATC center, using the ACARS compliant protocol.

16. The program product of claim 15, wherein the aircraft communication application is operative to provide a graphical and text interface for datalink messages.

17. The program product of claim 15, wherein the aircraft communication application is operative to provide flight management messaging that supports controller-pilot data link communication (CPDLC).

18. The program product of claim 15, wherein the aircraft communication application is operative to provide voice over Internet protocol (VoIP) communications, or session initiation protocol (SIP) communications.

19. The program product of claim 15, wherein the ACARS compliant protocol comprises a CPDLC compliant protocol.

20. The program product of claim 15, wherein the ACARS compliant protocol comprises a future air navigation system (FANS) 1/A compliant protocol.

* * * * *